United States Patent
Gillan et al.

(10) Patent No.: US 10,677,481 B2
(45) Date of Patent: *Jun. 9, 2020

(54) WATER DELIVERY FOR AN EVAPORATIVE COOLER

(71) Applicant: F.F. SEELEY NOMINEES PTY LTD., Lonsdale (AU)

(72) Inventors: Leland Gillan, Denver, CO (US); David Thompson, Littleton, CO (US)

(73) Assignee: F.F. SEELEY NOMINEES PTY LTD., Lonsdale (AU)

( * ) Notice: Subject to any disclaimer, the term of this patent is extended or adjusted under 35 U.S.C. 154(b) by 128 days.

This patent is subject to a terminal disclaimer.

(21) Appl. No.: 15/956,583

(22) Filed: Apr. 18, 2018

(65) Prior Publication Data

US 2018/0238569 A1  Aug. 23, 2018

Related U.S. Application Data

(63) Continuation of application No. 14/459,840, filed on Aug. 14, 2014, now Pat. No. 9,976,761.

(Continued)

(51) Int. Cl.
*F24F 5/00* (2006.01)
*F24F 1/0007* (2019.01)
*F24F 6/02* (2006.01)

(52) U.S. Cl.
CPC .......... *F24F 5/0035* (2013.01); *F24F 1/0007* (2013.01); *F24F 6/02* (2013.01)

(58) Field of Classification Search
CPC . F28D 5/00; F28D 5/02; F28D 9/0062; F28D 9/0068; F28F 25/02; F28F 3/025;
(Continued)

(56) References Cited

U.S. PATENT DOCUMENTS

| 3,058,726 A | 10/1962 | Goettl |
| 5,187,946 A | 2/1993 | Rotenberg et al. |

(Continued)

OTHER PUBLICATIONS

PCT International Search Report dated Dec. 8, 2014 in PCT/US2014/051115 (3 pages).

(Continued)

*Primary Examiner* — Emmanuel E Duke
(74) *Attorney, Agent, or Firm* — Northstar Law Group; Thomas J. Bassolino (57) ABSTRACT

A method of liquid delivery in an evaporative cooler having an assembly of plates may include delivering liquid from a fill tube to a first trough formed on a first plate of the assembly of plates, the first trough including a first perforation in fluid communication with a second trough formed on a second plate of the assembly of plates, the fill tube configured to deliver the liquid above the first perforation such that an exit point of the fill tube is not submerged in liquid at any point during liquid delivery or operation of the evaporative cooler, draining the liquid from the first trough to the second trough via the first perforation, and filling the second trough to an overflow level before permitting the liquid to exit the second trough via a second perforation, the overflow level defined by a bottom of the second perforation.

20 Claims, 7 Drawing Sheets

Related U.S. Application Data

(60) Provisional application No. 61/867,770, filed on Aug. 20, 2013.

(58) Field of Classification Search
CPC ........ F28F 25/08; F24F 5/0035; F24F 1/0007; F24F 6/00; F24F 6/02; F24F 6/04
See application file for complete search history.

(56) References Cited

U.S. PATENT DOCUMENTS

| | | | |
|---|---|---|---|
| 5,441,202 | A | 8/1995 | Wintering et al. |
| 6,705,096 | B2 | 3/2004 | Maisotsenko et al. |
| 6,892,805 | B1 | 5/2005 | Valensa |
| 2002/0073718 | A1* | 6/2002 | Maisotsenko .......... F24F 3/1411 62/121 |
| 2002/0073720 | A1 | 6/2002 | Bourne et al. |
| 2003/0145609 | A1* | 8/2003 | Maisotsenko .......... F24F 3/1411 62/121 |
| 2003/0209017 | A1* | 11/2003 | Maisotsenko .......... F24F 3/1411 62/121 |
| 2005/0218535 | A1 | 10/2005 | Maisotsenko et al. |
| 2009/0004732 | A1 | 1/2009 | LaBarre et al. |
| 2012/0047937 | A1 | 3/2012 | Cass |
| 2014/0070029 | A1 | 3/2014 | Alkalay |

OTHER PUBLICATIONS

PCT Written Opinon dated Dec. 8, 2014 in PCT/US2014/051115 (7 pages).
PCT International Preliminary Report on Patentability dated Feb. 23, 2016 in PCT/US2014/051115 (8 pages).

* cited by examiner

WATER DELIVERY FOR AN EVAPORATIVE COOLER

RELATED APPLICATIONS

This application is a continuation of U.S. patent application Ser. No. 14/459,840 filed on Aug. 14, 2014, which claims priority to U.S. Provisional Pat. App. No. 61/867,770 titled "Systems and Methods for a Nested Trough Stack Water Fill System" filed on Aug. 20, 2013, where these applications are herein incorporated by reference for all that they disclose.

TECHNICAL FIELD

The technology of the present application relates generally to evaporative air conditioners and, more specifically, to a liquid delivery system designed for use in evaporative air conditioners.

BACKGROUND

Evaporative cooling systems cool air through the evaporation of water. The temperature of dry air can be reduced through the phase transition of liquid water to water vapor. One such evaporative cooling system is described in U.S. Pat. No. 6,705,096 which describes an evaporative cooling system that incorporates plates with nested troughs. The plates wick water out of the trough. Water is added at a top trough to ensure sufficient amounts of water were present in the system. U.S. Pat. No. 6,705,096 is herein incorporated by reference in its entirety.

SUMMARY

In one embodiment, an evaporative cooler is described. The evaporative cooler may comprise an assembly of one or more plates. At least one trough proximate the one or more plates. A water delivery system may be proximate at least one trough. The water delivery system may comprise at least one supply tube and at least one fill tube, wherein the water delivery system is positioned to siphon air from the evaporative cooler when a continuous water supply is suspended.

In some embodiments, the at least one supply tube is positioned in fluid communication with the continuous water supply and the at least one fill tube is positioned in fluid communication with the at least one supply tube. The at least one supply tube and the at least one fill tube may be coupled together forming a water tight seal. In some embodiments, at least one perforation in the at least one trough may be present, wherein the perforation is positioned to define an overflow water level.

In some embodiments, the at least one fill tube is positioned above the overflow water level when the evaporative cooler is in an upright position. The at least one fill tube may comprise a first opening proximate the at least one trough, and a second opening proximate the at least one supply tube. The first opening of the fill tube may be positioned above the overflow water level. The second opening of the fill tube proximate the supply tube may be rotatably coupled to the supply tube. In some embodiments, the fill tube may be a nonlinear cylindrical member. The fill tube may be positioned between a series of nested troughs.

In further embodiments, an evaporative cooler is disclosed. The evaporative cooler may comprise an assembly of two or more dry plates and two or more wet plates in an upright position, wherein the wet and dry plates are alternatively stacked upon each other. At least one trough may be proximate each of the plates, wherein the troughs may be positioned to nest together. At least one perforation may be positioned in a closed trough in the dry plate and a second perforation may be positioned in an open trough in the wet plate. A water delivery system may be positioned to delivery water to the closed trough.

In some embodiments, the second perforation may be above the first perforation when the plates are connected in the upright position. The first perforation in the closed trough may be positioned to allow water to flow into the open trough in the wet plate. The second perforation may be positioned to define an overflow water level in the open and closed troughs. The water delivery system may be positioned to deliver water to the closed trough above the overflow water level. The second perforation in the open trough may be positioned to allow water to flow into a second closed trough nested below the open trough in the upright position.

In further embodiments, a water delivery system for an evaporative cooler is disclosed. The water delivery system may comprise a supply tube in fluid communication with a water supply source and at least one fill tube in fluid communication with the supply tube, wherein the at least one fill tube is proximate a trough in a plate assembly, wherein the at least one fill tube is positioned above an overflow water level in the trough when the evaporative cooler is in an upright position. The at least one fill tube may comprise a nonlinear cylindrical member. The nonlinear cylindrical member may be rotatably coupled to the supply tube.

For the purposes of this application, the term "aligned" refers to orientations that are parallel, substantially parallel, or forming an angle less than 35 degrees. Further, for the purposes of this application, the term "transverse" refers to orientations that are perpendicular, substantially perpendicular, or forming an angle between 125 degrees and 55 degrees.

BRIEF DESCRIPTION OF THE DRAWINGS

The accompanying drawings illustrate various embodiments of the present method and system and are a part of the specification. The illustrated embodiments are merely examples of the present system and method and do not limit the scope thereof.

Throughout the drawings, identical reference numbers designate similar, but not necessarily identical, elements. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Evaporative air cooling systems can have a complex heat and mass exchanger system. Evaporative cooling systems may comprise direct evaporative cooling systems, indirect evaporative cooling systems, two-stage evaporative cooling systems, hybrid systems, and the like. Evaporative air cooling systems work by introducing air into the system, then cooling the air by the heat absorbed from changing a liquid to vapor such as water to water vapor in air. A water supply system delivers water to hydrate and facilitate the heat and mass exchange process. However, as the water supply to the evaporative system is turned off, the water supply system may act as a siphon and remove water previously supplied to the system. For example, the water supply system may be submerged in the water delivered to the evaporative cooler. As a continuous water supply is suspended and drains from the system, the draining water may cause a siphon in tubing within the water delivery system and pull water out of the system. The siphoning may additionally cause water at upper levels to drain into lower levels and may result in an ineffective cooling system lacking the necessary water to adequately cool air.

According to one configuration, a water delivery system for an evaporative cooler system may increase the thermodynamic performance of the evaporative air cooler. For example, evaporative coolers may use the thermodynamic properties of moist air to produce a cool, dry product air. An exemplary water delivery system may deliver precise amounts of water to the system ensuring efficient cooling systems by providing predictable thermodynamic results. The water delivery system may be positioned such that water is effectively delivered to the cooling system and water is not siphoned off or otherwise removed from the system. For example, the water delivery system may comprise at least one fill tube in fluid communication with a water supply. The fill tube may be positioned within the system to prevent siphoning water from the system. For example, the water delivery system may be positioned to deliver water above a water level such that when a continuous water supply is suspended and water drains from the system creating a siphon, the fill tube may siphon air out of the system instead of water.

Figure 1:
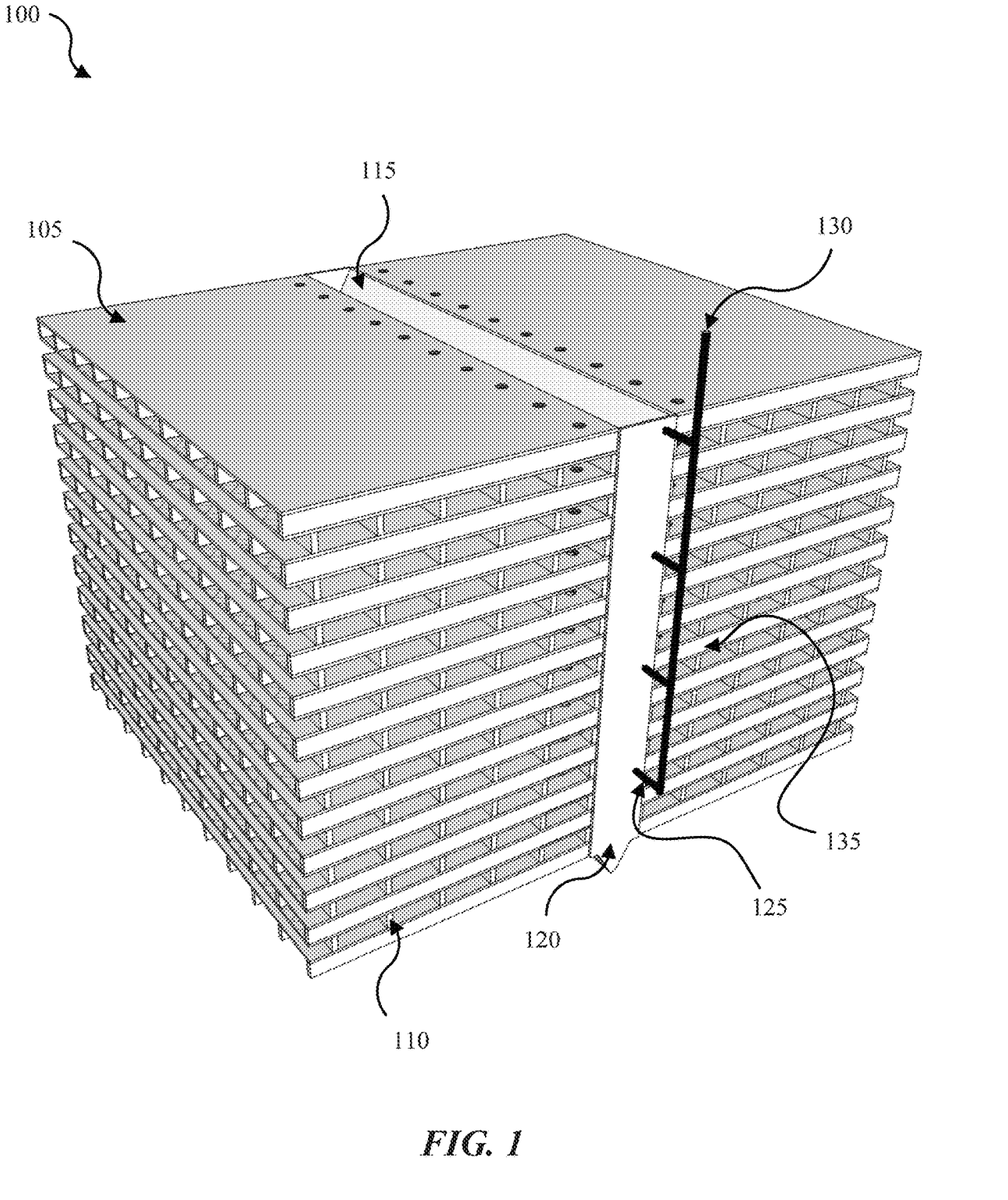
FIG. 1 is an isometric view of an exemplary evaporative cooling system according to one exemplary embodiment.

FIG. 1 illustrates an exemplary evaporative cooling system 100. The system 100 may comprise a heat and mass exchange system. In some embodiments, the system 100 may include one or more plates 105, a trough 115, and a water delivery system 135. In alternative embodiments, the system 100 may include additional or fewer components. For example, in some embodiments, the system 100 may include a fan (not shown) which introduces air into the system 100. The system 100 may also include an air discharge system (not shown), a water discharge system (not shown) or the like.

In some embodiments, the plates 105 may be stacked to form a substantially three-dimensional shape. The shape may be cubic, rectangular, or the like. In some embodiments, the plates 105 may comprise a substantially planar surface. One or more channel guides 110 may separate the plates 105 to allow air flow between the plates 105. In one embodiment, the porous plate 105 may comprise a porous material. The porous material may have wicking capabilities and/or may allow a gaseous medium to flow through it. In further embodiments, the porous material may be a sheet of polymer material, such as polypropylene spun bond material forming a fiber surface. In further embodiments, the wicking material may comprise a polymer-based, cellulose, or other organic material. One side of the plate 105 may comprise a non-permeable material. For example, one side of the plate 105 may comprise another type of polymer material, such as a polypropylene/polyethylene extruded seal layer; however, any appropriate type of polymer material may be used. The seal layer may be adhered, cast on, melted to, heat staked, or otherwise affixed to the plate 105. In some embodiments, the plate 105 may be approximately 20 inches wide by approximately 19.5 inches long and approximately 0.01 inches thick. However, any appropriate dimensions in accordance with the principles described herein may be used.

In some embodiments, a trough 115 are nested in the plates 105. The trough 115 may be an open-top vessel capable of retaining a liquid which may be vaporized for cooling. In some embodiments, the trough 115 may be a feature of the plate 105. For example, the trough 115 may be nested in a center of the plate 105. The troughs 115 may align where the one or more plates 105 are stacked together. The system 100 may include a trough seal 120 on either side of the trough 115. The trough seal 120 may retain liquid inside the troughs 115. For example, in some embodiments, the system 100 may include a water delivery system 135 that comprises fill tubes 125 that distribute water to various troughs 115. A supply tube 130 may be connectively coupled to the fill tubes 125 such as to supply the water to the fill tubes 125. In some embodiment, the supply tube 130 may be in fluid communication with a water supply and in fluid communication with the fill tubes 125. In conventional evaporative cooling system, the fill tube 125 is submerged in water, and the fill tube 125 extract water from the troughs due to a siphoning effect, explained further below.

Figure 2A:
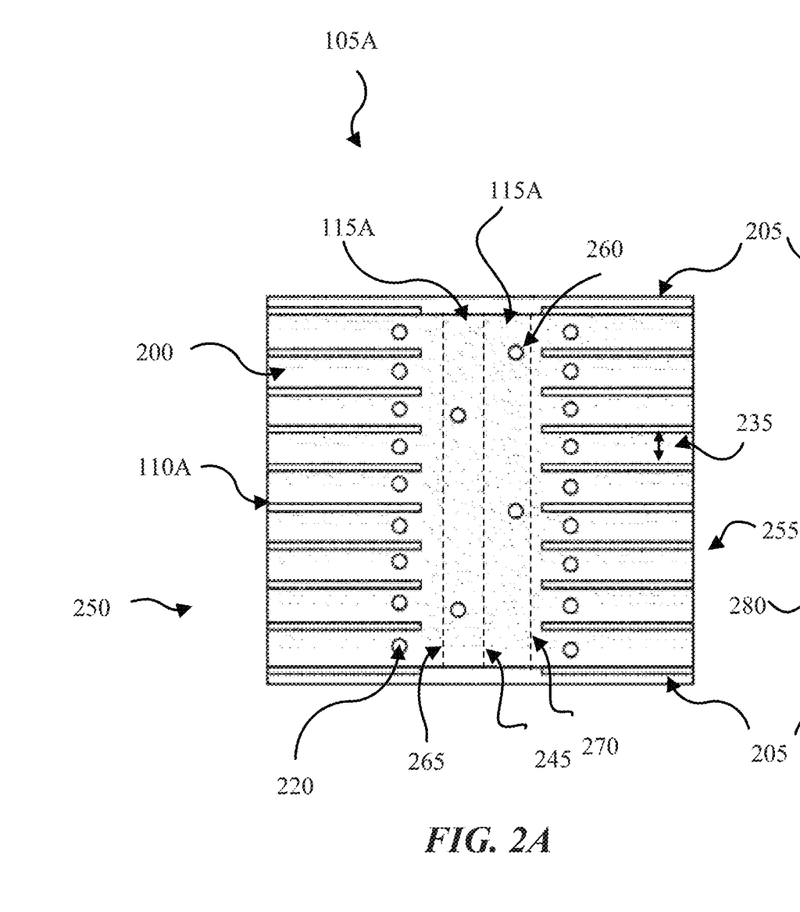
FIGS. 2A & 2B are top views of exemplary plates used in the evaporative cooling system of FIG. 1, according to one exemplary embodiment.

FIG. 2A is a top view of a wet plate 105A. For the purposes of this disclosure, the term "wet plate" indicates plates 105A constructed to contain moisture on a top side of the plate 105A. In some embodiments, the wet plate 105A may include two or more wet side channel guides 110A. For example, in some embodiments, the wet plate 105A may contain two wet channel guides 110A on opposing sides of the wet plate 105A. In further embodiments, the wet plate 105A may contain multiple channel guides 110A forming multiple wet channels 200. In some embodiments, one or more seals 205 may be formed at opposing ends 210, 215 of the wet plate 105A. In some embodiments, a distance 235 between the wet channel guides 110A may be approximately one inch. In additional embodiments, the wet channel guide 110A spacing may be increased or decreased for desired air flow.

In further embodiments, one or more perforations 220 may be formed in the body of the wet plate 105A. The perforations 220 may allow air to flow through them. The perforations 220 may be separated by wet channel guides 110A. In some embodiments, multiple perforations 220 may be formed within the body of the wet plate 105A and may align in a substantially linear pattern. The substantially linear pattern may be substantially transverse to the wet channel guides 110A. In further embodiments, as shown in FIG. 2A, the one or more perforations 220 may form two substantially linear patterns which may substantially align with each and be substantially transverse to the channel guides 110A.

An open trough 115A may be located in substantially the center of the wet plate 105A. For example, the open trough 115A may have a centerline 245 equidistant between a first side 250 and second side 255 of the wet plate 105A. In other embodiments, the centerline 245 may be positioned in any orientation on the wet plate 105A. For example, the centerline 245 may be closer to either the first or second sides 250, 255 of the wet plate 105A. The centerline 245 may indicate a bottom of the open trough 115A. For example, the open trough 115A may have a substantially triangular cross-section. The centerline 245 may represent an apex of the triangular cross-section. In other embodiments, the centerline 245 may indicate the lowest point in the open trough 115A. For example, the centerline 245 may indicate a point in the open trough 115A which is the furthest from a top surface 315 (See FIG. 3) of the wet plate 105a. The centerline 245 need not be the center of the open trough 115A. For example, the open trough 115A may have a first intersection 265 with the wet plate 105A and a second intersection 270 with the wet plate 105A. The intersections 265, 270 may be where the open trough 115A meets the wet plate 105A. In some embodiments, the centerline 245 may be closer to one intersection 265 or the other 270. In further embodiments, one or more perforations 260 may be present in the open trough 115A. The one or more perforations 260 may pass substantially through the wet plate 105A. The one or more perforations 260 may be located closer to an intersection 265, 270 than the centerline 245. In some embodiments, the one or more perforations 260 may be positioned to allow a liquid to pass through it.

Figure 2B:
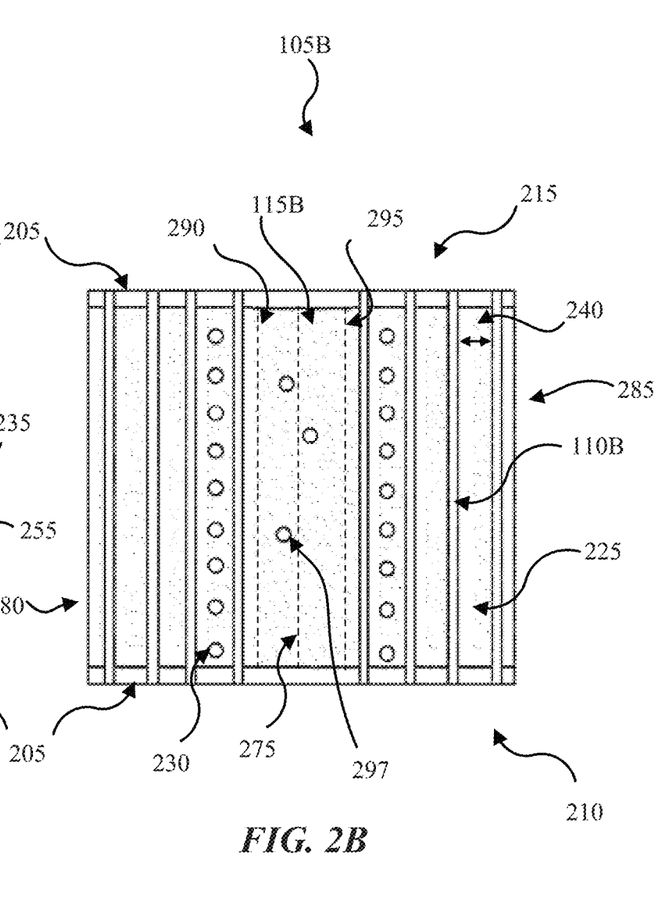

FIG. 2B is a top view of a dry plate 105B. For the purposes of this disclosure, the term "dry plate" indicates plates 105 having channels guides 110 on the dry side of the plate 105. The dry plate 105B may contain one or more channel guides 110B. The channel guides 110B may be substantially transverse to the seals 205, and may be formed on top of the seals 205. In some embodiments, multiple dry channel guides 110B may be present. The dry channel guides 110B may form one or more dry channels 225. The dry channels 225 may be substantially transverse to the seals 205. In further embodiments, a width 240 of the dry channels 225 may be approximately one inch. However, any appropriate width may be used. The dry channels 225 may run substantially across a top surface 305 (see FIG. 3) of the dry plate 105B.

In some embodiments, the dry plate 105B may contain one or more perforations 230. The perforations 230 may allow for air to flow through them. The perforations 230 may not be necessary in dry plates 105B if the perforations 220 are provided in the wet plates 105A or vice versa. However, in some embodiments, perforations 220, 230 may be provided in both the wet and dry plates 105A, 105B. In some embodiments, multiple perforations 230 may be formed within the body of the dry plate 105B and may align in a substantially linear pattern. The substantially linear pattern may substantially align with the dry channel guides 110B. The substantially linear pattern of the perforations 230 may be contained between two dry channel guides 110B. In further embodiments, as shown in FIG. 2B, the one or more perforations 220 may be formed in two substantially linear patterns which may substantially align with each other and substantially align with the channel guides 110B.

A closed trough 115B may be located in substantially the center of the dry plate 105B. For purposes of this disclosure, a closed trough 115B indicates a trough 115 formed in a dry plate 105B. The closed trough 115B may still contain a liquid, which may be evaporated for cooling purposes. Such a closed trough 115B may be prevented from having fluid communication through the dry plate. In other examples, the fluid communication between the closed trough and the dry plate is restricted due to walls of the dry channel guides 110B that close the closed trough. In some embodiments, the closed trough 115B may have a centerline 275 equidistant between a first side 280 and second side 285 of the dry plate 105B. In other embodiments, the centerline 275 may be positioned in any orientation on the dry plate 105B. For example, the centerline 275 may be closer to either the first or second sides 280, 285 of the dry plate 105B. The centerline 275 may indicate a bottom of the closed trough 115B. For example, the closed trough 115B may have a substantially triangular cross-section. The centerline 275 may represent an apex of the triangular cross-section. In other embodiments, the centerline 275 may indicate the lowest point in the closed trough 115B. For example, the centerline 275 may indicate a point in the closed trough 115B which is furthest from a top surface 305 (See FIG. 3) of the dry plate 105B. The centerline 275 may not necessarily be the center of the closed trough 115B. For example, the closed trough 115B may have a first intersection 290 with the dry plate 105B and a second intersection 295 with the dry plate 105B. The intersections 290, 295 may be where the closed trough 115B meets the dry plate 105B. In some embodiments, the centerline 275 may be closer to one intersection 290 or the other 295. In some embodiments, the closed trough 115B may be positioned such as to nest together with an open trough 115A when the plates 105 are assembled. In further embodiments, one or more perforations 297 may be present in the trough. The one or more perforations 297 may pass substantially through the dry plate 105B. The one or more perforations 297 may be located closer to the centerline 275 than an intersection 290, 295. In some embodiments, the one or more perforations 297 may be positioned to allow a liquid to pass through it.

Figure 3:
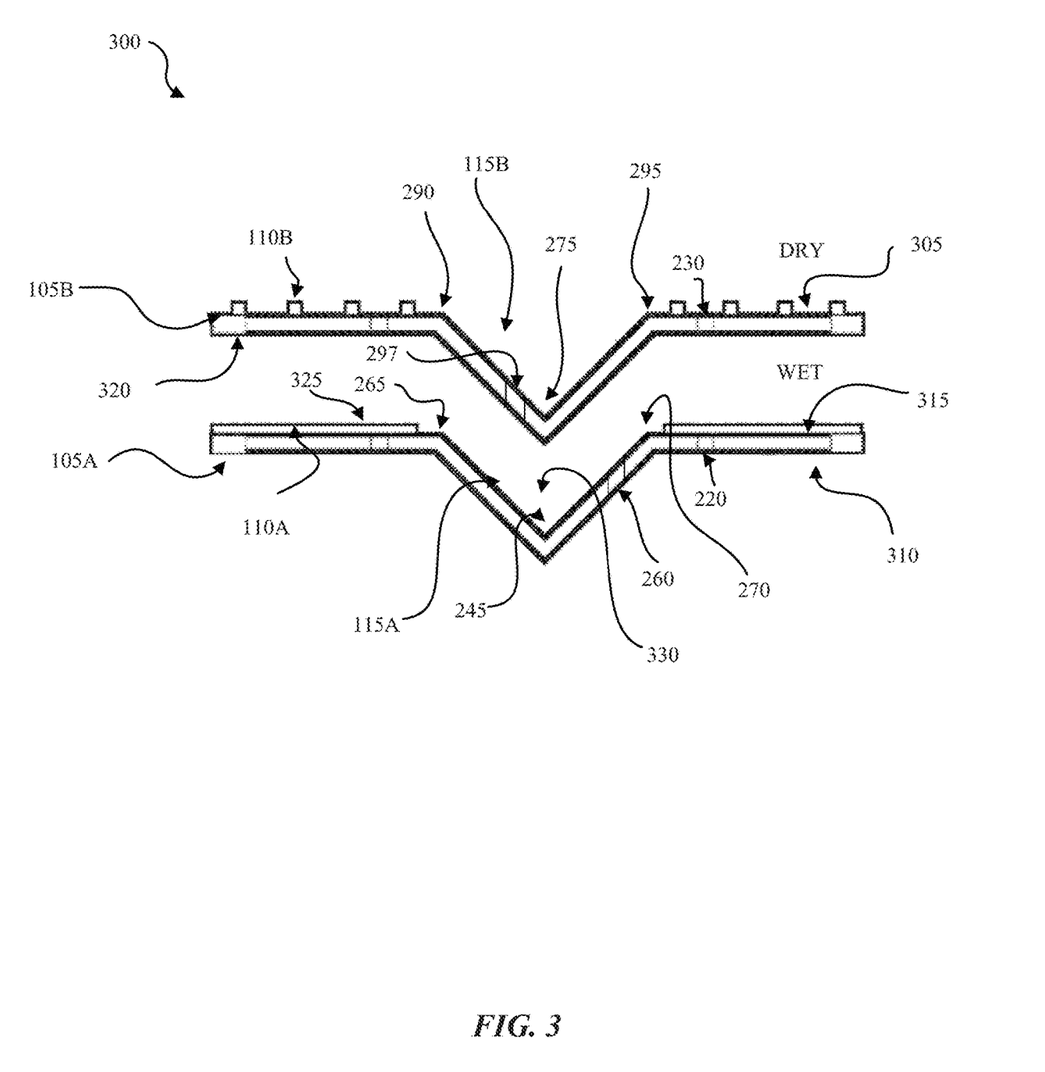
FIG. 3 is an exploded side view of the plate assembly used in the evaporative cooling system of FIG. 1, according to one exemplary embodiment.

FIG. 3 is an exploded side view of an assembly 300 comprising the wet plate 105A and the dry plate 105B. The assembly 300 may comprise the plates 105 in a substantially stacked configuration. For example, the assembly 300 may comprise alternating stacking of dry plates 105B and wet plates 105A. The stacked configuration may represent a potential use of the plates 105 in an evaporative cooling system (e.g. system 100). As shown in FIG. 3, the top plate is the dry plate 105B and the bottom plate is the wet plate 105A. The bottom surface 320 of the dry plate 105B and a top surface 315 of the wet plate 105A may be exposed to a liquid. The surfaces 320, 315 may comprise a wicking material. The wicking material may comprise a polymer spun bound material, cellulose, or other material. In further embodiments, a bottom surface 310 of the wet plate 105A and a top surface 305 of the dry plate 105B may be sealed. For example, the surfaces 310, 305 may comprise a non-permeable material. The non-permeable material may be a polymer extruded seal layer and may be affixed or otherwise coupled to the spun bond material.

When assembled, the bottom surface 320 of the dry plate 105B may rest upon a top surface 325 of the wet channel guides 110A. The wet channel guides 110A may be sized such that a distance between the bottom surface 320 of the dry plate 105B and the top surface 315 of the wet plate 105A is substantially uniform. For example, the wet channel guides 110A may be approximately 0.09 inches high such that the distance between the plates 105A, 105B is approximately 0.09 inches. However, any appropriate distance may be used. Subsequently, when a second dry plate 105B is assembled on beneath the wet plate 105A, the dry channel guides 110B may define a distance between the two plates 105A, 105B. The distance may be approximately 0.14 inches. However, any appropriate distance may be used. The distances between the plates 105 may be adjusted to maximize efficiency or to achieve a desired air flow.

In additional embodiments, each plate 105A, 105B may include a trough 115A, 115B. As mentioned previously, the trough 115 may be an open-topped vessel which may retain a liquid used in cooling. The troughs 115A, 115B may align such that the troughs 115A, 115B may fit inside one another or nest together when the plates 105A, 105B are assembled. For example, the bottom of trough 115B may, in some examples, extend below the intersections 265, 270 between open trough 115A and wet plate 105A so as to least partially fill a volume formed by the wet trough 115B. In other examples, the bottom of trough 115B stops short of extending below the intersections 265, 270. The trough 115 may have a substantially triangular shape. The triangular shape may allow a fluid used in cooling, such as water, to collect in a bottom 330 of the trough 115. In alternative embodiments, the troughs 115 may comprise a substantially circular shape, oval shape, non-uniform shape, or the like. The troughs 115A, 115B may be nested such that the troughs 115A, 115B have similar shapes and can be stacked into one another one.

In further embodiments, the open trough 115A may provide a liquid, such as water, to the wet plate 105A. In some embodiments, a water delivery system 135 (FIG. 1) may deliver water to the closed trough 115B. Water may then exit through the perforation 297 into the open trough 115A. In some embodiments, when the wet plate 105A and the dry plate 105B are assembled, the perforation 260 in the open trough 115A may be above and/or higher than the perforation 297 in the closed trough 115B. Therefore, the perforation 260 may define a water overflow level. For example, as water exits the closed trough 115B via the perforation 297, it may accumulate in the open trough 115A. As the water accumulates, the water level may rise to the perforation 260 and exit the perforation. Another dry plate 105B may be located beneath the wet plate 105A. Therefore, the water exiting the open trough 115A via the perforation 260 may accumulate in a second closed trough 115B in a second dry plate 105B. The water delivery system 135 (FIG. 1) may be positioned such that a fill tube is above the overflow level. This may prevent a siphoning effect (discussed below).

The arrangement of plates with nested troughs provide a mechanism for providing the water and/or other coolant to the system in a vertical mechanism. Water supplied in a first trough may be distributed to other troughs located beneath the first trough. Thus water supplied to a top trough may direct water to any trough located below the top trough through the perforations and the geometry of the trough. In some examples, the geometry of the troughs cause a portion of the water to the troughs beneath. Such geometries may include angled walls such as shown in the triangular geometry of the troughs in FIG. 3. Such an arrangement efficiently distributes water and/or other liquids to each of the wet plates 105A.

Figure 4:
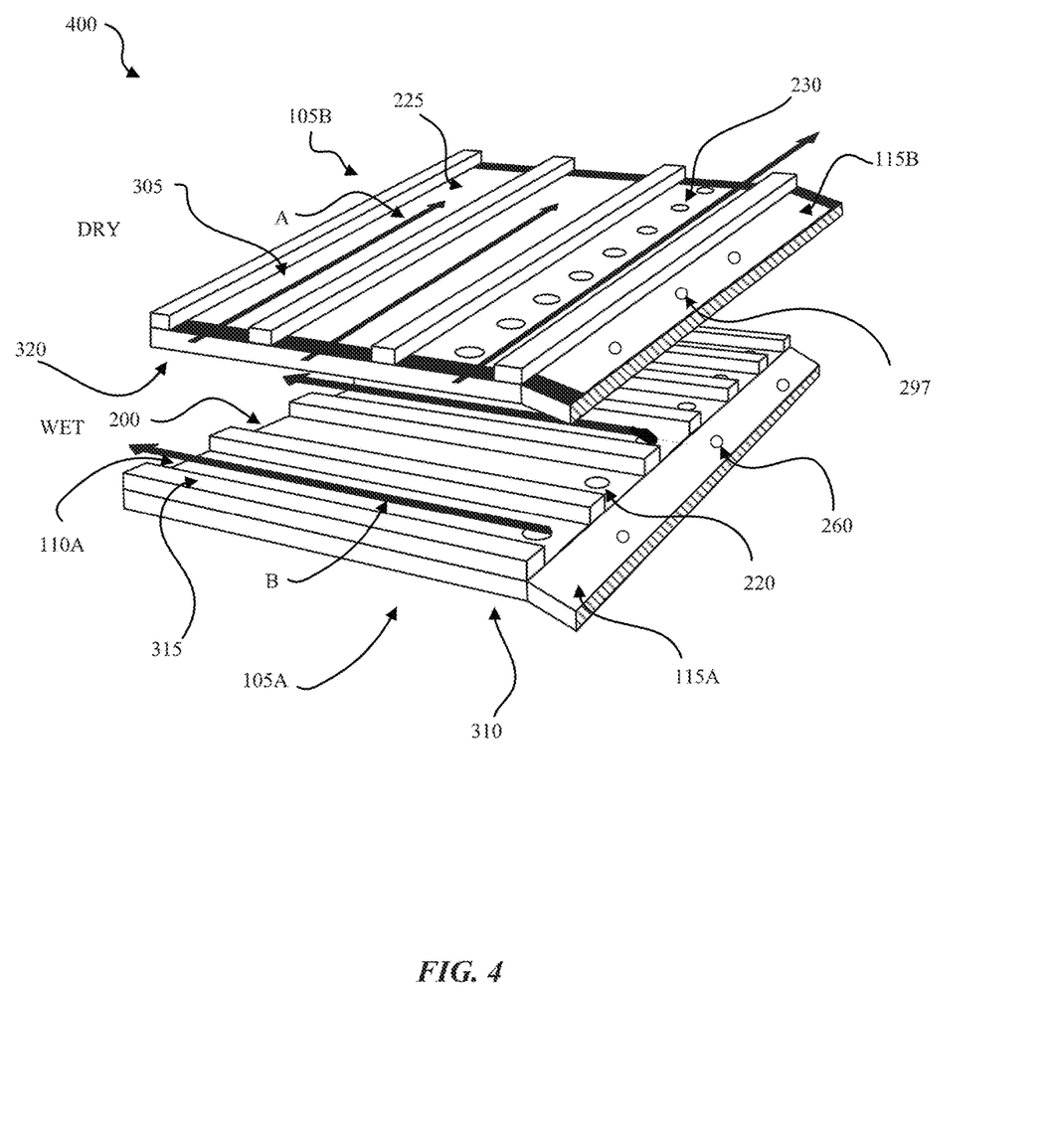
FIG. 4 is an exploded isometric view of the plate assembly shown in FIG. 3, according to one exemplary embodiment.

FIG. 4 is a working schematic representation of an evaporative cooling system 400 according to this disclosure. The system 400, as displayed, is an isometric cut-away view of an assembly of a wet plate 105A and a dry plate 105B. Thus, just half of the troughs 115A and 115B are depicted in FIG. 4. The system 400 may cool air, called product air, through the use of evaporating water into air, called working air. Air may be introduced in the system 400 via a number of methods. For example, air may be drawn into the system 400 via a fan, wind, bellows, Coanda effect, suction, and the like. In further embodiments, the system 400 may have multiple plates 105A, 105B with a dry side and a wet side.

The system 400 may cool air by passing product air through the dry channels 225 as shown by arrows A. Working air may be fractioned off into the wet channels 200. The working air may travel the length of the wet channels 200 as shown by arrows B. As mentioned previously, the wet side of the plates 105 may comprise a wicking material. The wicking material may draw liquid stored in the troughs 115A through the wet channels 200. As the working air passes through the wet channels 200 along path B, the liquid may evaporate and cool the working air. As the product air travels along path A in the dry channel 225, the product air may be cooled via heat transfer. For example, heat in the product air may be transferred to the working air. Therefore, the system 400 may produce a cool, dry product air and may discharge a humid, hot working air.

As the liquid is drawn from the open trough 115A, the liquid may travel through the wet channels 200 along a liquid wick path, which may substantially align with arrows B. As the liquid is drawn from the open trough 115A, the amount of liquid in the troughs 115 decreases. Over the usage of an exemplary evaporative cooling system, more liquid may need to be added to the open troughs 115A to ensure adequate cooling and effectiveness of the system 400. In some embodiments, a closed trough 115B may be located above and/or below the wet plate 105A. As the water level in the open trough 115A decreases, water in a closed trough 115B positioned above the wet plate 105A may contain water and allow the water to flow into the open trough 115A. In further embodiments, if the open trough 115A has a rising water level, water may drain from the open trough 115A via one or more perforations 260 into the closed trough 115B beneath the open trough 115A.

Figure 5:
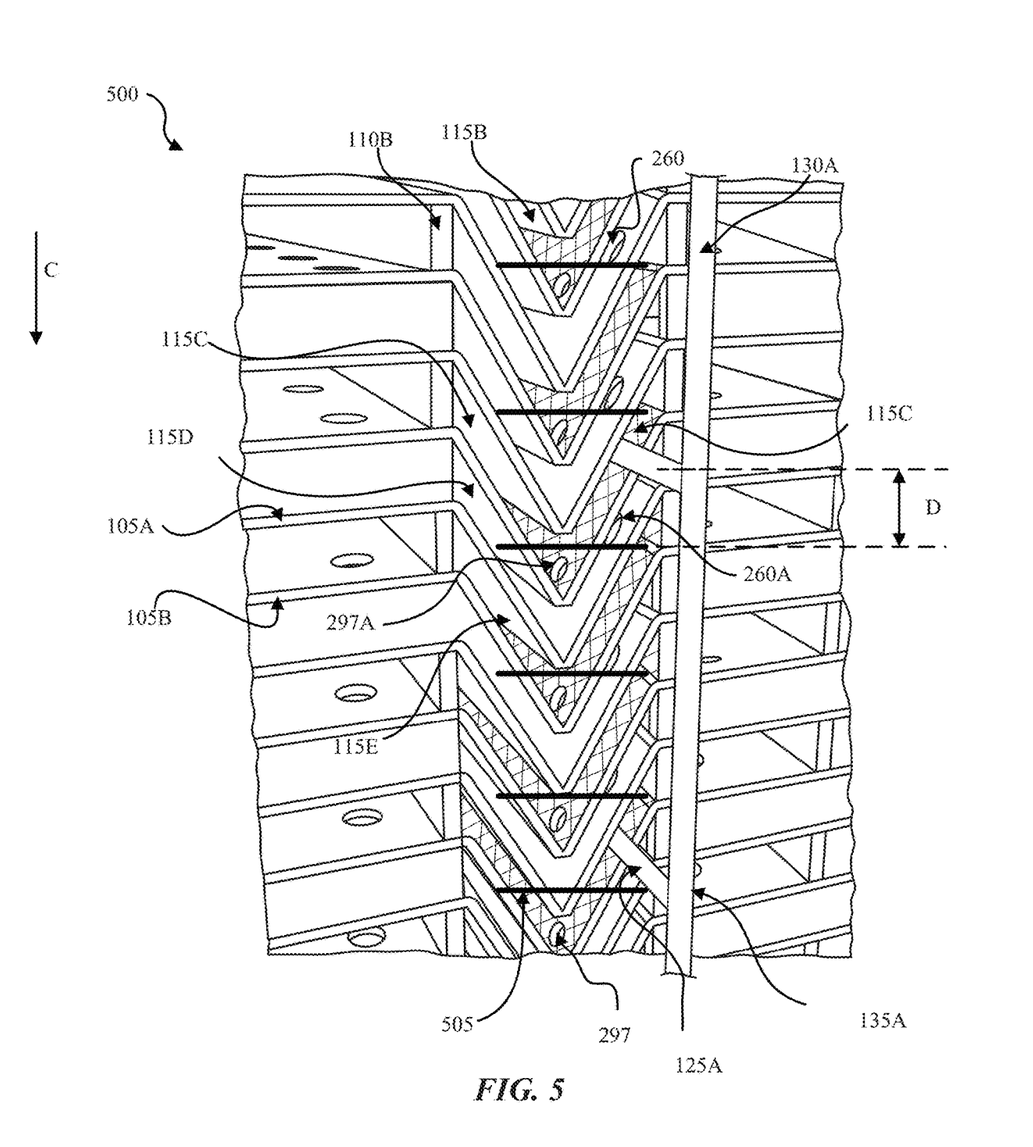
FIG. 5 is an exemplary cut-away internal view of the evaporative cooling system in FIG. 1, according to one exemplary embodiment.

FIG. 5 is an exemplary embodiment of an evaporative cooling system 500. In some embodiments, the system 500 may include one or more plates 105, one or more troughs 115, and a water delivery system 135A. In alternative embodiments, the system 500 may include additional or fewer components. For example, in some embodiments, the system 500 may include a fan (not shown) which introduces air into the system 500. The system 500 may also include an air discharge system (not shown), a water discharge system (not shown) or the like.

The water delivery system 135A may comprise a supply tube 130A connectively coupled to at least one fill tube 125A such as to supply the liquid to the fill tubes 125A. For example, the fill tube 125A may be a cylinder. The cylinder may have a first opening on a first end of the cylinder proximate the trough, and a second opening proximate the supply tube. The second opening of the fill tube 125A may be fluid communication with the supply tube. The first opening may be positioned within the system 500. In some embodiments, the tubes 130A, 125A may comprise a rigid material such as a metal, plastic, or the like. In further embodiments, the tubes 130A, 125A may comprise similar or dissimilar materials. For example, the supply tube 130A may comprise a plastic whereas the fill tube 125A may comprise a metal or vice versa. In further examples, the supply tube 130A and fill tube 125A may both comprise a plastic material. The similar materials may be the same, or may be alike. For example, the supply tube 130A and the fill tube 125A may comprise a copper material, or one may comprise a copper tube and the other may comprise a stainless steel tube. In some embodiments, the tubes 125A, 130A may comprise a flexible material. For example, the tubes 125A, 130A may comprise a flexible plastic material which may allow the tubes 125A, 130A to conform as desired.

In some embodiments, the at least one fill tube 125A and the supply tube 130A may form an inseparable assembly. In other embodiments, the at least one fill tube 125A may be adhered, heat melted, glued, or tight fit to the supply tube 130A. For example, the supply tube 130A may have a fitting sized to accept an outer diameter of the fill tube 125A. In further embodiments, the fill tube 125 may be threadably engaged with the supply tube 130A. For example, a series of threads on the fill tube 125A may mate with a series of threads on the supply tube 130A such that the tubes 125A, 130A form a water tight seal. The fill tubes 125A may supply a liquid, such as water, to the troughs 115. In some embodiments, the supply tube 130A and the fill tubes 125A may be substantially linear cylindrical members. In some embodiments, the supply tube 130A and/or fill tubes 125 may be incorporated into a non-circular body. For example, the supply tube 130A and/or the fill tubes may be incorporated into an injection molded part, a forged part, a casted part, or another type of part that has a rectangular shape or any other appropriate type of shape. Further, the supply and/or fill tubes may be formed within such a part through any appropriate type of mechanism. For example, such supply and/or fill tubes may be formed through molds, drilling, or any other appropriate method. In further embodiments, the supply tube 130A and fill tube 125A may form a substantially right angle at the joining point. In some embodiments supply tube 130A and multiple fill tubes 125A can be made from injection molded parts that make up the entire assembly for an evaporative cooling system 100 including the trough seal 120.

Dry channel guides 110B may prevent the liquid from evaporating or passing into the product air, thus sealing the closed troughs 115B. Perforations 260, 297 in the troughs 115 may allow the water to flow in a direction C. For example, the water delivery system 135A may deliver water to a first trough 115C, which may be a closed trough 115B. As the water flows into the closed trough 115C, water may exit the first closed trough 115C via perforation 297A and fill open trough 115D beneath the closed trough 115C. As water begins to fill the open trough 115D, the water may rise to an overflow level 505. The overflow level 505 may be an overflow water level. As the water in the open trough 115D increases, the water may surpass the overflow level 505. As water passes the overflow level 505, the perforation 260A may allow water to drain into the trough located beneath it, which is a closed trough 115E. The water in the open troughs is wicked into the channels of the wet plates where the water evaporates into the passing air flow. As the water moves out of the troughs, the water is replaced by additional water draining from one trough to another as described above. The water continues to move down through the stack of plates 105 until the water either evaporates, or exits the system 500 via a water discharge system (not shown). In some embodiments, multiple fill tubes 125A are incorporated into the system 500. Such fill tubes 125A may deliver water into every other closed trough 115B. In other embodiments, the fill tube 125A may be spaced further apart or closer together.

The fill tubes 125A may be positioned such that the fill tubes 125A are not submerged in water when the system 500 is operating. For example, the fill tube 125A may be a distance D above the overflow level 505. In some examples, the fill tube 125A is located just above the overflow level 505. In other embodiments, the fill tube 125A may be sufficiently above the overflow level 505. For example, the fill tube 125A may be a tenth of an inch to an inch above the overflow level 505. In some instances, the fill tube 125A may be half an inch above the overflow level 505. By positioning the fill tube 125A above the overflow level 505, the first opening on the fill tube 125A may also be above the overflow level 505. By having the exit point on the fill tube 125A above the overflow level 505, the exit point is not likely to be submerged in water. This may prevent the fill tube 125A and water delivery system 135A from siphoning water out of the system 500 when continuous water delivery is suspended or shut off. For example, the continuous water supply may be terminated for a length of time, or the continuous water supply may be pulsed, or other have a varying flow rate and/or pressure rate.

For example, when the water is shut off and stops running through the tubes 125A, 130A, the water may tend to evacuate from the tubes 125A, 130A. In some embodiments, the water may evacuate the tubes in a direction C. As the water exits the tubes, it may create a siphon. If the fill tube 125A exit point is submerged, the siphon may extract water from the system 500. In contrast, with the fill tube 125A above the water level 505, the water delivery system 135A may not extract water from the system 500, but rather will siphon air out of the system 500 leaving the water level intact. By ensuring the water level is not adjusted by suspending water delivery, the system 500 may retain adequate water levels to ensure desirable system performance. The absence of siphoning may also allow for more accurate and precise amounts of water to be delivered to the system 500. Therefore, more accurate thermodynamic calculations may occur to better predict the functionality of the cooling system 500.

Figure 6:
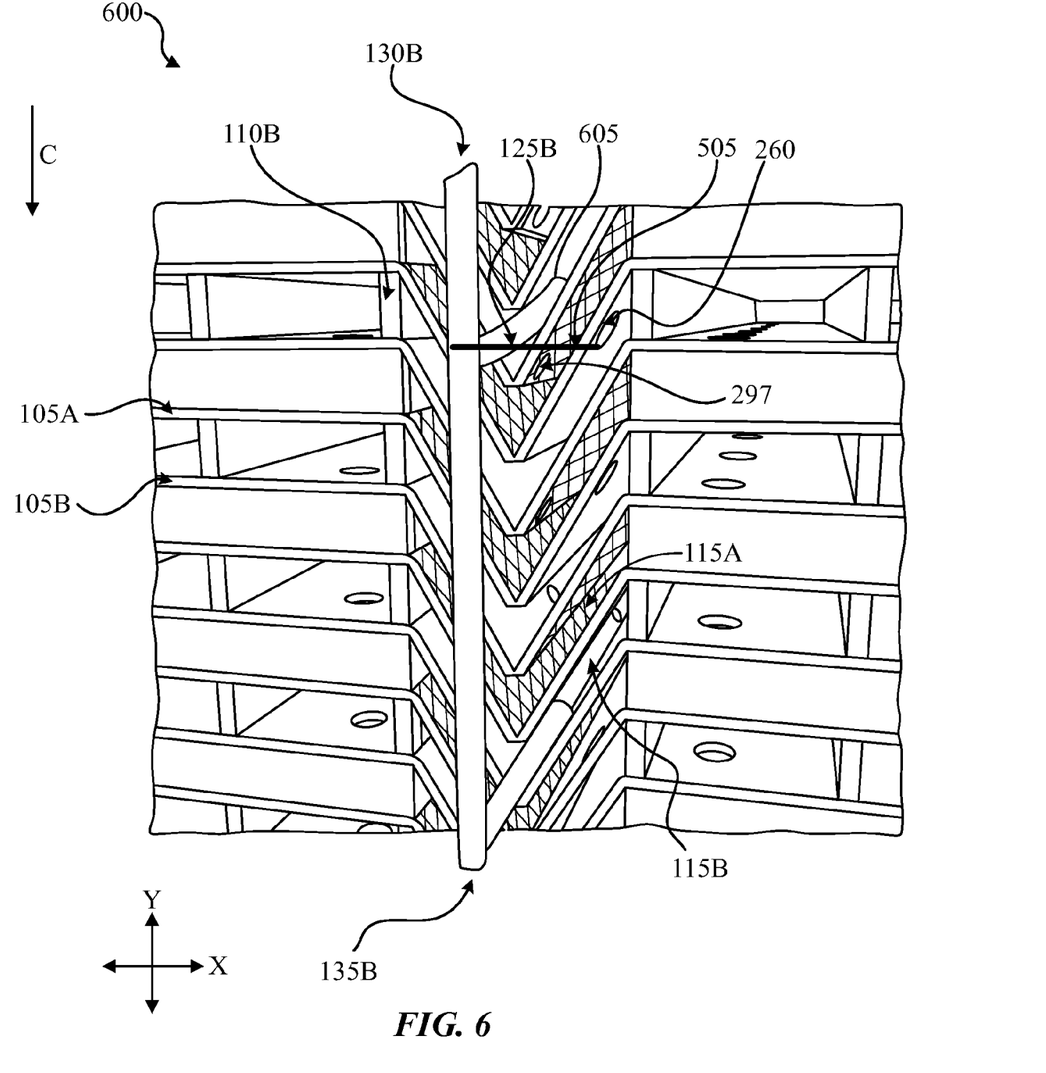
FIG. 6 is an exemplary cut-away internal view of the evaporative cooling system of FIG. 1, according to one exemplary embodiment.

FIG. 6 is another exemplary embodiment of a water delivery system 135B in an evaporative cooling system 600. In some embodiments, the system 600 may include one or more plates 105, a trough 115, and a water delivery system 135B. In alternative embodiments, the system 600 may include additional or fewer components. For example, in some embodiments, the system 600 may include a fan (not shown) which introduces air into the system 600. The system 600 may also include an air discharge system (not shown), a water discharge system (not shown) or the like.

The water delivery system 135B may comprise a supply tube 130B connectively coupled to at least one fill tube 125B. The supply tube 130B and fill tube 125B may comprise similar material and characteristics as the supply tube 130A and the fill tube 125A. The supply tube 130B and the at least one fill tube 125B may be in fluid communication such as to supply a liquid, such as water, to the troughs 115. The water delivery system 135B may operate similar to the water delivery system 135A. For example, the water delivery 135B system may deliver water to the closed trough 115B. The water may trickle down through the system 600 via various perforations 260, 297 in the troughs 115.

In some embodiments, the fill tube 125B and the supply tube 130B may be an inseparable assembly where the fill tubes 125B are integrally formed with the supply tube 130B. In other embodiments, the fill tube 125B may be adhered, heat melted, glued, or interference fitted to the supply tube 130B. For example, the supply tube 130B may have a fitting size to accept an outer diameter of the fill tube 125B. In further embodiments, the fill tube 125 may be threadably engaged with the supply tube 130B. For example, a series of threads on the fill tube 125B are formed to mate with a series of threads on the supply tube 130B such that the tubes 125B, 130B such that when threaded together, the threads of the tubes form a water tight seal. In some examples, o-rings or other types of components are incorporated into the connection between the tubes to at least partially form a seal. The fill tubes 125 may supply a liquid, such as water, to the troughs 115. In some embodiments, the supply tube 130B and the fill tubes 125B may be substantially straight cylindrical members. In further embodiments, the supply tube 130B and fill tube 125B may form a substantially acute angle at the joining point.

The fill tube 125B may have a nonlinear shape. For example, the fill tube 125 may have a substantially cylindrical cross-section and a substantially curved body. The curved body of the fill tube 125B may allow an exit point 605 of the fill tube 125B to be above a water level 505 in the trough 115. The water level 505 may be a maximum fill level where perforation 260 is formed. In some embodiments, the body of the fill tube 125B may be curved in multiple directions. For example, the body of the fill tube 125B may be curved in a Y direction such that the exit point 605 of the fill tube 125B is above the water level 505. Additionally, the body of the fill tube 125B may be curved in an X direction such as to fit between the plates 105.

By curving the body of the fill tube 125B to position the exit point 605 of the fill tube 125B above the water level 505, the water delivery system 135B may prevent water from siphoning out of the system 600. For example, when the water is shut off and stops running through the tubes, the water may tend to evacuate from the tubes. In some embodiments, the water may evacuate the tubes in a direction C. As the water exits the tubes, a low pressure may form behind the exiting water. The principles described herein prevent water from the troughs from being pulled back into the fill tubes to fill the low pressure. On the other hand, if the fill tube exit point 605 is submerged in water, the siphoning action may extract water from the system 600. In contrast, with the exit point 605 of the fill tube 125B above the water level 505, the water delivery system 135B may not extract water from the system 600, but rather will siphon air out of the system 600 while leaving the quantity of water unchanged. By ensuring the water level is not adjusted by suspending water delivery, the system 600 may retain adequate water levels to ensure desirable system performance. The absence of siphoning may also allow for more accurate and precise amounts of water to be delivered to the system. Therefore, more accurate thermodynamic calculations may occur to better predict the functionality of the cooling system 600.

Figure 7:
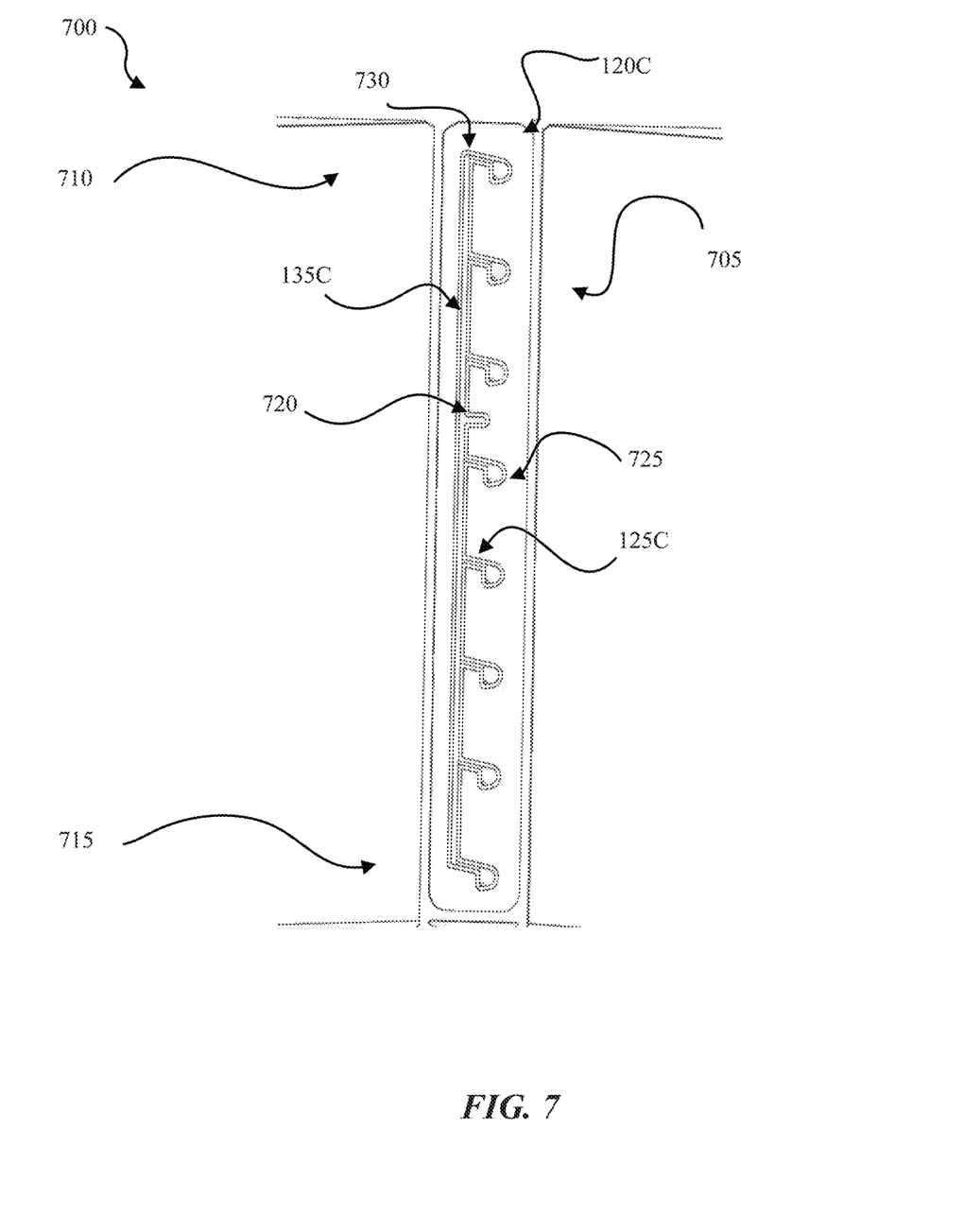
FIG. 7 is an exemplary view of a water delivery system of the evaporative cooling system in FIG. 1, according to one exemplary embodiment.

FIG. 7 is another embodiment of an evaporative cooling system 700. The evaporative cooling system 700 as shown may comprise a water delivery system 705. The water delivery system 705 may comprise one or more supply tubes 135C, one or more fill tubes 125C, and one or more water supply connectors 720. The evaporative cooling system 700 may comprise additional or fewer components than those shown in FIG. 7.

The one or more supply tubes 135C and one or more fill tubes 125C may be similar to the one or more supply tubes 135 and one or more fill tubes 125. In the example of FIG. 7, the supply tubes 135C and/or fill tubes 125C are formed in an injection molded part. In some embodiments, the one or more fill tubes 125C may create a tortuous path. For example, the one or more fill tubes 125C may have a series of twists and turns. In some examples, variations in the diameters of portions of the supply tubes and/or fill tubes may contribute to forming a tortuous path. Using a tortuous path in the fill tubes 125C may control the speed of the flow of water through the tubes. The tortuous path in the fill tubes 125C may not have the same characteristics for every fill tube. For example, fill tubes 125C towards an upper end 710 of the water delivery system 705 may have a different characteristic than the fill tubes 125C towards a bottom end 715 of the water delivery system 705.

The one or more water supply connectors 720 may connect the water delivery system 705 to a main water supply (not shown). The one or more water supply connectors 705 may be an integral piece of the water delivery system 705. The one or more water supply connectors 705 may be fluidly connected to the main water supply via a series of one or more tubes. The one or more tubes may be press fit, threaded, or otherwise physically connected to the water supply connector 720.

In some embodiments, the tortuous path of the fill tubes 125C may be based at least in part on the distance and/or orientation between the fill tube 125C and the one or more water supply connectors 720. For example, the differing characteristics of the tortuous paths in the individual fill tubes may define a water supply pressure to the one or more troughs 115 (FIG. 3). The initial water pressure in a fill tube 725 just below the water supply connector 720 may be greater than the water pressure in a fill tube 730 farther above the water supply connector 720. This may be a result of water pressure reducing the farther the water travels from the water supply connector 720 and/or the effects of gravity on the water supply pressure. Introducing various tortuous paths may thus result in substantially the same amount of water pressure in each fill tube regardless of orientation or distance from the one or more water supply connectors 720.

In some embodiments, the fill tube 125C may comprise differing internal geometry. For example, the tortuous path may in a portion of the fill tube 125C external, or outside of, the troughs. A second portion of the fill tube 125C may pass through the trough seal 120C. The second portion of the fill tube 125C may deliver a liquid, such as water, to one or more troughs 115 (FIG. 3) internal to the evaporative cooling system 700. The second portion may comprise a substantially straight cylinder. In some embodiments, the second portion of the fill tube 125C may be slightly curved or bent to fit between the nested troughs 115 (FIG. 3).

While the technology of the present application is described with respect to evaporative air conditioners, the technology disclosed herein may be applicable to other air conditioners, and even more generally to any application where a liquid evaporates from a wetted surface. Moreover, the technology disclosed herein will be described with reference to certain exemplary embodiments. The word "exemplary" is used herein to mean "serving as an example, instance, or illustration." Any embodiment described herein as "exemplary" is not necessarily to be construed as preferred or advantageous over other embodiments absent a specific indication that such an embodiment is preferred or advantageous over other embodiments. Moreover, in certain instances only a single "exemplary" embodiment is provided. A single example is not necessarily to be construed as the only embodiment. The detailed description includes specific details for the purpose of providing a thorough understanding of the technology of the present patent application. However, on reading the disclosure, it will be apparent to those skilled in the art that the technology of the present patent application may be practiced with or without these specific details. In some descriptions herein, generally understood structures and devices may be shown in block diagrams to aid in understanding the technology of the present patent application without obscuring the technology herein. In certain instances and examples herein, the term "coupled" or "in communication with" means connected using either a direct link or indirect data link as is generally understood in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A method of liquid delivery in an evaporative cooler having an assembly of plates, the method comprising:
   delivering liquid from a fill tube to a first trough formed on a first plate of the assembly of plates, the first trough including a first perforation in fluid communication with a second trough formed on a second plate of the assembly of plates, the fill tube including an exit point positioned above the first perforation such that the fill tube is structurally configured to deliver the liquid above the first perforation so that the exit point of the fill tube is not submerged in liquid at any point during liquid delivery or operation of the evaporative cooler;
   draining the liquid from the first trough to the second trough via the first perforation; and
   filling the second trough to an overflow level before permitting the liquid to exit the second trough via a second perforation, the overflow level defined by a bottom of the second perforation.

2. The method of claim 1, further comprising suspending delivery of the liquid to the assembly of plates and preventing siphoning of liquid from the assembly of plates into the fill tube.

3. The method of claim 1, wherein the fill tube has a curved body with the exit point located at the highest portion of the curved body.

4. The method of claim 1, wherein the exit point of the fill tube is disposed a predetermined distance D above the first perforation.

5. The method of claim 4, wherein D is greater than or equal to a tenth of an inch.

6. The method of claim 4, wherein D is greater than or equal to an inch.

7. The method of claim 1, further comprising distributing liquid through a supply tube disposed external to the assembly of plates, the supply tube in fluid communication with the fill tube and a liquid supply source.

8. The method of claim 1, further comprising permitting the liquid to drain from the second trough and fill subsequent troughs formed in plates disposed below the second plate until the liquid evaporates or exits the assembly of plates via a discharge system.

9. The method of claim 1, wherein the first plate and the second plate are aligned such that the first trough and the second trough are nested with one another in the evaporative cooler.

10. The method of claim 1, further comprising delivering liquid into one or more other troughs formed on one or more other plates in the assembly of plates.

11. The method of claim 10, wherein the first trough and each of the one or more other troughs are sealed with channel guides to prevent the liquid from evaporating or passing into air flowing along the one or more other plates.

12. The method of claim 1, further comprising preventing the liquid from evaporating or passing into air flowing along the first plate by sealing the first trough with one or more channel guides.

13. The method of claim 1, further comprising wicking the liquid from the second trough into channels formed on the second plate and permitting the liquid to evaporate into air flowing over the second plate.

14. The method of claim 13, wherein the second trough is substantially open to the second plate to accommodate the wicking.

15. The method of claim 1, wherein the first trough is a closed trough.

16. An evaporative cooler, comprising:
    an assembly of plates comprising dry plates and wet plates alternatively stacked upon each other;
    troughs formed in each of the dry plates and wet plates, wherein the troughs are nested with one another in the assembly of plates;
    a first perforation positioned toward a bottom portion of the trough of each dry plate, the first perforation placing the dry plate in fluid communication with a wet plate disposed immediately beneath the dry plate;
    a second perforation positioned toward a top portion of the trough of each wet plate, the second perforation placing the wet plate in fluid communication with a dry plate disposed immediately beneath the wet plate, the second perforation defining an overflow level for the wet plate; and
    a water delivery system comprising a supply tube and a fill tube, the supply tube disposed external to the assembly of plates and in fluid communication with both the fill tube and a water supply, the fill tube at least partially disposed within a trough of a dry plate and the fill tube including an exit point positioned above the first perforation of the trough of the dry plate such that the fill tube is structurally configured to deliver water above the first perforation so that the exit point of the fill tube is not submerged in water at any point during water delivery or operation of the evaporative cooler.

17. The evaporative cooler of claim 16, wherein the fill tube has a curved body with the exit point located at the highest portion of the curved body.

18. The evaporative cooler of claim 16, further comprising a second fill tube in fluid communication with the supply tube, the second fill tube disposed in a trough of a second dry plate for delivering water into the trough of the second dry plate.

19. The evaporative cooler of claim 16, further comprising channel guides sealing the trough of each dry plate to prevent water from evaporating or passing into air flowing along the dry plates.

20. The evaporative cooler of claim 16, wherein the exit point of the fill tube is disposed a predetermined distance D above the first perforation, and wherein D is greater than or equal to a tenth of an inch.

* * * * *